March 9, 1937.
E. ELLSBERG
2,073,446
METHOD FOR REFINING HYDROCARBON OILS
Filed June 1, 1933
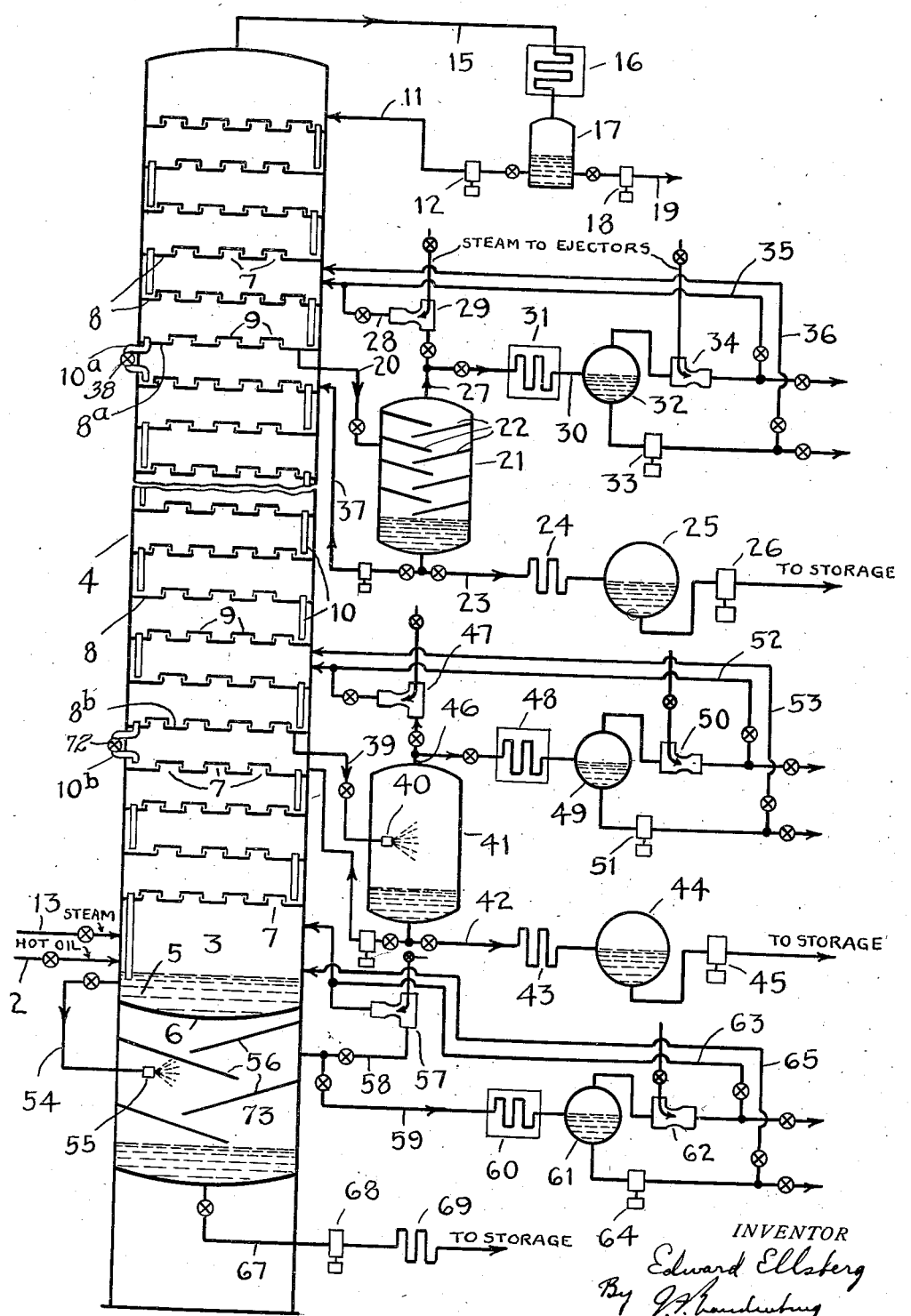
INVENTOR
Edward Ellsberg
By J. A. Brandenburg
ATTORNEY Patented Mar. 9, 1937

2,073,446

UNITED STATES PATENT OFFICE 2,073,446

METHOD FOR REFINING HYDROCARBON OILS

Edward Ellsberg, Westfield, N. J., assignor, by mesne assignments, of three-fourths to Tide Water Associated Oil Company, New York, N. Y., a corporation of Delaware Application June 1, 1933, Serial No. 673,803

2 Claims. (Cl. 196—77)

In the continuous distillation of hydrocarbon oils of relatively wide boiling range, such as crude petroleum, for example, and their fractionation into cuts ranging from light distillates such as gasoline and kerosene through progressively heavier fractions in the lubricating oil range down to the heaviest residues suitable for cylinder stocks, it is common practice, well known to those acquainted with the art, to heat the oil to be distilled to a temperature sufficient to vaporize all the fractions to be made and in addition usually to vaporize part of the ultimate residue, and then to discharge the heated oil into a fractionating column, refluxing the vapors rising toward the top of the column in the conventional manner with part of the overhead condensate, which reflux traveling down the column condenses on the plates or trays in the column progressively heavier fractions of more or less commercially homogeneous oils. Depending on the number of plates in the column (and its height) fairly close cut fractions can be withdrawn from appropriate plates in the column to obtain hydrocarbon oils of approximately the character desired, while the bottom residue may be obtained of a suitable viscosity according to the crude being run and the temperature to which it has been heated. The above operation is customarily carried out under atmospheric pressure or under some degree of vacuum as may be desired to suit the hydrocarbon oil being distilled.

Inasmuch as on each plate or tray in the fractionating column from which a liquid fraction may be withdrawn as a desired product, the liquid is in approximate equilibrium with the vapors rising through it, which vapors of necessity comprise mainly vapors of lower boiling range than the liquid on the tray in question, the liquid withdrawn will contain not only hydrocarbons of the desired boiling range to give the product wanted, but to a slight degree will contain also in solution some of the liquid of a boiling point lower than that desired in the stream withdrawn, with the result that the product obtained will be inferior to that desired in the upper end of its distillation curve, which involves the flash point.

The purpose of this invention is to overcome these deficiencies and to produce a product of higher quality continuously while at the same time eliminating the need for such extra steps as re-running, by a simple and advantageous process of removing continuously the undesired minor percentages of lower boiling hydrocarbons, giving continuously superior quality fractions to any desired degree of homogeneity.

In this method, the liquid fraction to be reduced, being part or all of the liquid on the tray from which it is taken, is continuously withdrawn from contact with the oil and vapors in the main column at an appropriate tray or plate and flows into a separate adjacent chamber where it is subjected to a vacuum of greater or lesser degree as may be necessary, the liquid fraction being then at a temperature compatible with and equal to its mean boiling point under the conditions existing in the main column. In this chamber the liquid sprays into space, or may be cascaded in thin films over suitable baffles, or both. Under the influence of the vacuum to which the fraction is subjected, and in the absence of the relatively large quantities of low boiling vapors which maintained the previous equilibrium, the slight amount of low boiling oil in the fraction, being at a temperature higher than its boiling point, can no longer maintain its equilibrium in the solution, and flashes into a vapor which is removed from the chamber at a suitable point in the upper part of the chamber, while the remaining liquid drops to the bottom of the chamber and is continuously withdrawn as the finished product, or a part of this liquid may be returned to the main column as reflux below the point of original withdrawal.

Any desired degree of separation of light ends from the fraction withdrawn from the fractionating column can be obtained by increasing the degree of vacuum applied to the separating chamber, which regulation is easily obtained up to any degree approaching a perfect vacuum that may be desired by using a properly sized vacuum ejector with one or two stages as may be necessary, together with a condenser of any usual type between the ejector and the chamber, when desired, or a conventional vacuum pump, though the ejector is preferred as being simple to install and to regulate.

The vapors withdrawn from the vacuum chamber may be discharged together with the exhaust steam from the jet ejector into the column at a plate above that from which the liquid was withdrawn, so that the vapors proceed up the column to be further fractionated, while the steam mingles with the vapors and the steam from the moisture in the original oil and such other steam as may have been added below from other jets or in the conventional manner; or the vapors withdrawn are condensed and the condensate is returned to the column for further fractionation.

In like manner, each liquid oil stream withdrawn from the side of the column, may, out of contact with the liquid and vapors in the column, be similarly treated in simple apparatus and at slight expense.

In like manner, the residual oil remaining in the bottom of the fractionating tower after the whole liquid has been flashed may be drawn into a separate chamber and be similarly treated to obtain residual cylinder stocks of high quality with respect to flash.

The accompanying drawing is a schematic illustration of apparatus for carrying out the process. Since the fractionating column may be of any height and may contain any number of fractionating plates, a portion of this column is shown broken out.

The crude or oil to be fractionated is continuously heated to the requisite temperature in passage through a conventional heater (not shown) and the stream of heated oil and vapors is continuously delivered through pipe 2 into the lower chamber 3 of a main fractionating apparatus 4, such as a conventional bubble tower or column. All the part of the oil that will vaporize under the conditions is released as vapors at this region, and the unvaporized liquid residue collects in a pool 5 on the bottom wall 6 of the fractionating column proper. The vapors rise upward through the column, passing through vapor openings 7 in the numerous plates 8 and beneath bubble caps 9, in contact with reflux oil which flows over the plates and through downtake pipes 10, this reflux liquid being supplied to the upper portion of the column through a line 11 containing a pump 12. Steam may be supplied through a line 13 entering the lower portion of the fractionating column.

The light distillate vapors, gasoline for example, which gain the top of the fractionating column, are taken off through a vapor line 15 and are condensed in a condenser 16. From a chamber 17 the condensate is pumped by a pump 18 through a line 19 to storage. The reflux liquid that is pumped into the top of the column may be a portion of this light distillate.

One or more liquid streams of an intermediate fraction or fractions are withdrawn from the side of the column at elevations where desired fractions are to be obtained, depending upon the design of the column and the character of the oil that is fractionated.

An upper side stream is taken off through a valved line 20 to a separating chamber 21 having means for attenuating the stream, such means being represented in this instance by baffles 22. This stream, which may be kerosene or a light lubricating oil stock, consistent with the relative location of the plate of the fractionating column from which it is taken, contains in solution a minor proportion of constituents of boiling points below the boiling range of the main fraction. In order to remove these detrimental light ends, a vacuum of an appropriate order is maintained in the chamber 21, this vacuum being sufficient to overcome the effect of the equilibrium that existed between the condensed oil and the large amount of lighter vapors in contact with each other in the particular portion of the fractionating column. The result is that the light constituents can no longer remain in solution in the stream and are flashed off in the chamber 21. The liquid oil freed of these vapors is drawn off from the bottom of the chamber through a line 23, a cooler 24, a receiver 25 and a pump 26, and is delivered to storage. The comparatively small amount of vapor disengaged in the chamber and passing off above is returned to the fractionating column. For reasons of simplicity and ease of regulation a steam ejector jet pump is preferably utilized as the means for subjecting the fraction to the vacuum. The vacuum pump, whatever its nature, is connected with the vapor outlet 27 from the chamber 21. As illustrated, this outlet has a branch 28 containing a jet ejector 29, this branch delivering the released vapors back to the fractionating column at a level above that from which the fraction is taken off through line 20. Another branch 30 contains a condenser 31 and a receiving vessel 32 from which the light oil condensed in the condenser may be withdrawn through a pump 33. When the branch 28 is shut off and the branch 30 is utilized, the vacuum in the chamber 21 is created by an ejector or other vacuum pump 34 connected with an outlet from the space of the receiver 32 occupied principally by incondensibles. Vapors discharged from ejector 34 may be returned to the column, as is the overhead condensate collected in receiver 32. This is illustrated in the drawing by valved lines 35 and 36 branched, respectively, from the discharge line from the ejector 34 and the discharge line from the pump 33 and leading back to the fractionating column.

Instead of withdrawing, for treatment in vacuum chamber 21, a part only of the liquid oil that descends upon the plate of the fractionating column from which this side stream is taken, which plate may be designated 8ᵃ, all of the liquid may be drawn off from this part of the fractionating column and be injected into the chamber 21. In that event, part of the treated oil that passes from the lower portion of this chamber is delivered through a line 37 to the fractionating column 4 at a point beneath the plate 8ᵃ, to serve as reflux on plates below, while the remainder of the treated fraction is withdrawn through line 23, cooler 24, etc., as a product. When operating in this manner, the downtake pipe 10ᵃ from the plate 8ᵃ may be shut off, for which purpose this pipe is shown carried outside the shell of the column and back again and provided with a valve 38.

Another side stream of an intermediate fraction is withdrawn from a lower portion of the column 4 through a valved line 39, and is attenuated by spraying through a nozzle 40 projecting into a vacuum separating chamber 41, or by filming over baffles as in chamber 21, or both. This fraction is heavier than the fraction treated in the chamber 21 and may be understood to be a lubricating oil stock. The light ends dissolved in this stream are flashed off in the chamber 41 under the influence of the vacuum, and the liquid fraction, freed of these relatively light hydrocarbons, is withdrawn from the bottom of the chamber, through a line 42, a cooler 43, a receiver 44 and a pump 45, to storage. The operation is similar to that performed in connection with the chamber 21, and the same arrangements for maintaining vacuum on the chamber and for disposing of the released vapors are illustrated. The vapor outlet 46 of the chamber has two branches, one of which contains an ejector pump 47 and is designed to return the vapors to the column, while the other branch contains a condenser 48, and receiver 49, to the free space of which an ejector pump 50 is connected and from which the oil condensed from the vapors may be delivered by a pump 51. The condensate discharged from pump 51 is delivered back to the fractionating column through line 53 and vapors removed by the ejector 50 may also be returned to the column through line 52, these lines corresponding to the lines 36 and 35 referred to in connection with the treatment of the first side stream.

Likewise, the entire flow of reflux in the fractionating column may be diverted from the column at the plate 8$^b$ and after the flashing off of its relatively light ends in the vacuum chamber 41, a part of this treated oil may be introduced into the fractionating column below the plate 8$^b$ to serve as the reflux flowing downward over the plates below. The downtake pipe 10$^b$ of the plate 8$^b$ is shown arranged like the downtake 10$^a$ of plate 8$^a$ so that it may be conveniently provided with a valve 72.

The unvaporized residual oil that is obtained at the base of the fractionating column proper is treated in the same manner as the distillate side streams. The chamber 73 in which these bottoms are freed of their relatively low boiling components is preferably built in as a sub-section of the fractionating column structure, though separate from the interior of the fractionating column itself. In like manner, the invention would not be departed from if the vacuum separating chambers for the distillate side streams were built into the structure of the main column.

The bottoms are withdrawn from the sump of the chamber 3 through a line 54 and are sprayed from a nozzle 55 into the chamber 73, where baffles 56 may also be provided. The vacuum in this chamber results from the action of an ejector jet pump 57 in a line 58 leading from the upper part of the chamber 73 and arranged to deliver the vapors to the chamber 3.

Again, the vapors from the chamber 73 may be conducted through a line 59 to a condenser 60, from which the condensate and uncondensed vapors enter a receiver 61, in which case the vacuum in the chamber 73 is obtained by the action of an ejector 62 connected with the vapor space of this receiver. As in the other similar arrangements previously described, it is easy in this way to obtain a vacuum as high as may be required with economy of steam for the ejector pump. The vapors discharged from the ejector 62 may be delivered from the system, or through a line 63 to the chamber 3. Condensate withdrawn from the receiver 61 by pump 64 may be either delivered from the system or through a line 65 to the chamber 3.

The residual oil, from which the vapors have been flashed in chamber 73, is taken off from the bottom of this chamber through a line 67 and is pumped by a pump 68 through a cooler 69 to storage. This material is, for example, a cylinder stock.

It is possible by the herein disclosed method to obtain much higher quality products in each individual fraction than can be obtained by conventional vacuum distillation, or by conventional atmospheric distillation, without the need of going to two-stage distillation stills as at present, with a relatively tremendous tower in the vacuum stage required to handle huge volumes of vapors under vacuum, inasmuch as here only liquids are injected into the vacuum chambers and the vapors handled in each chamber are slight as regards quantity and volume even under vacuum; nor is it necessary as in conventional atmospheric distillation (even when steam is used) to go to as high temperatures to obtain desirable viscosities and flashes on the bottoms, or high quality intermediate fractions devoid of undesirable light ends, while the use of large quantities and volumes of steam in the main tower, whether under vacuum or atmospheric conditions, is avoided and smaller towers may be used with better results.

Operation of the main fractionating column under a degree of vacuum not being excluded in the practice of the herein described process, it is to be understood that the vacuum to which a fraction is subjected in any of the separating or flash chambers must be lower than the vacuum, if any, existing in the main column.

I claim:

1. In continuous fractional distillation of hydrocarbon oils, in which the heated material is subjected to reflux fractionation in a column and in which a stream of liquid oil is removed continuously from contact with liquid oil and vapors in the fractionating column, the improvement which comprises subjecting the removed liquid material, while in a flash chamber and not in contact with steam and with no further fractionation in said chamber, to vacuum created by the ejector action of a steam jet, and returning to the column the material thus released as vapor, together with the exhaust steam from said jet.

2. In continuous fractional distillation of hydrocarbon oils, in which the heated material is subjected to reflux fractionation in a column and in which a stream of liquid oil is removed continuously from contact with liquid oil and vapors in the fractionating column, the improvement which comprises subjecting the removed liquid material, while in a flash chamber and not in contact with steam and with no further fractionation in said chamber, to vacuum created by the action of a steam jet, and returning the vapors thus released with the steam from said jet to the column at a point above the point of original withdrawal.

EDWARD ELLSBERG.